Dec. 27, 1955 M. P. WINTHER 2,728,243
TRANSMISSION CONTROL SYSTEM
Filed March 6, 1952 6 Sheets-Sheet 2
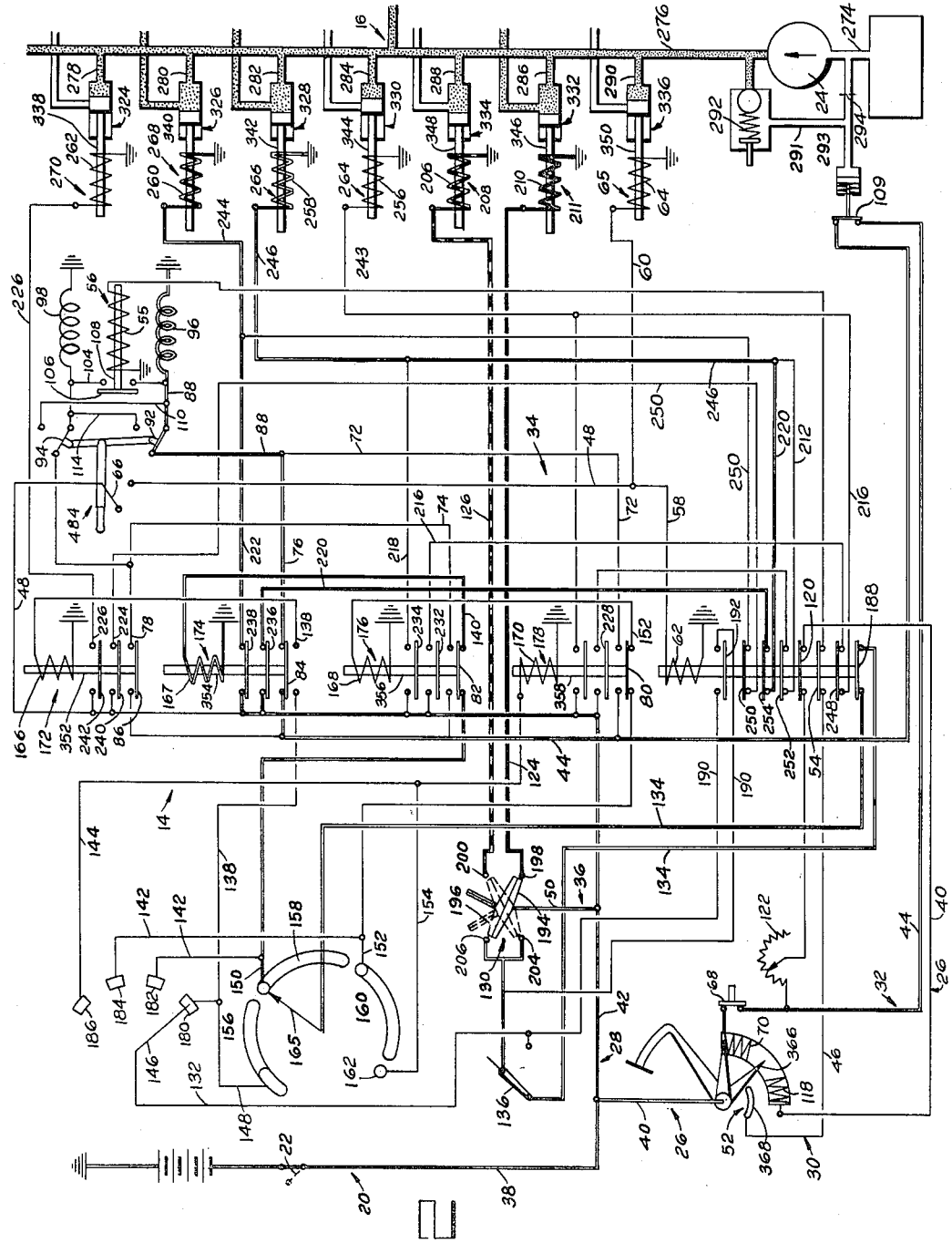
INVENTOR.
MARTIN P. WINTHER
BY
ATTORNEYS

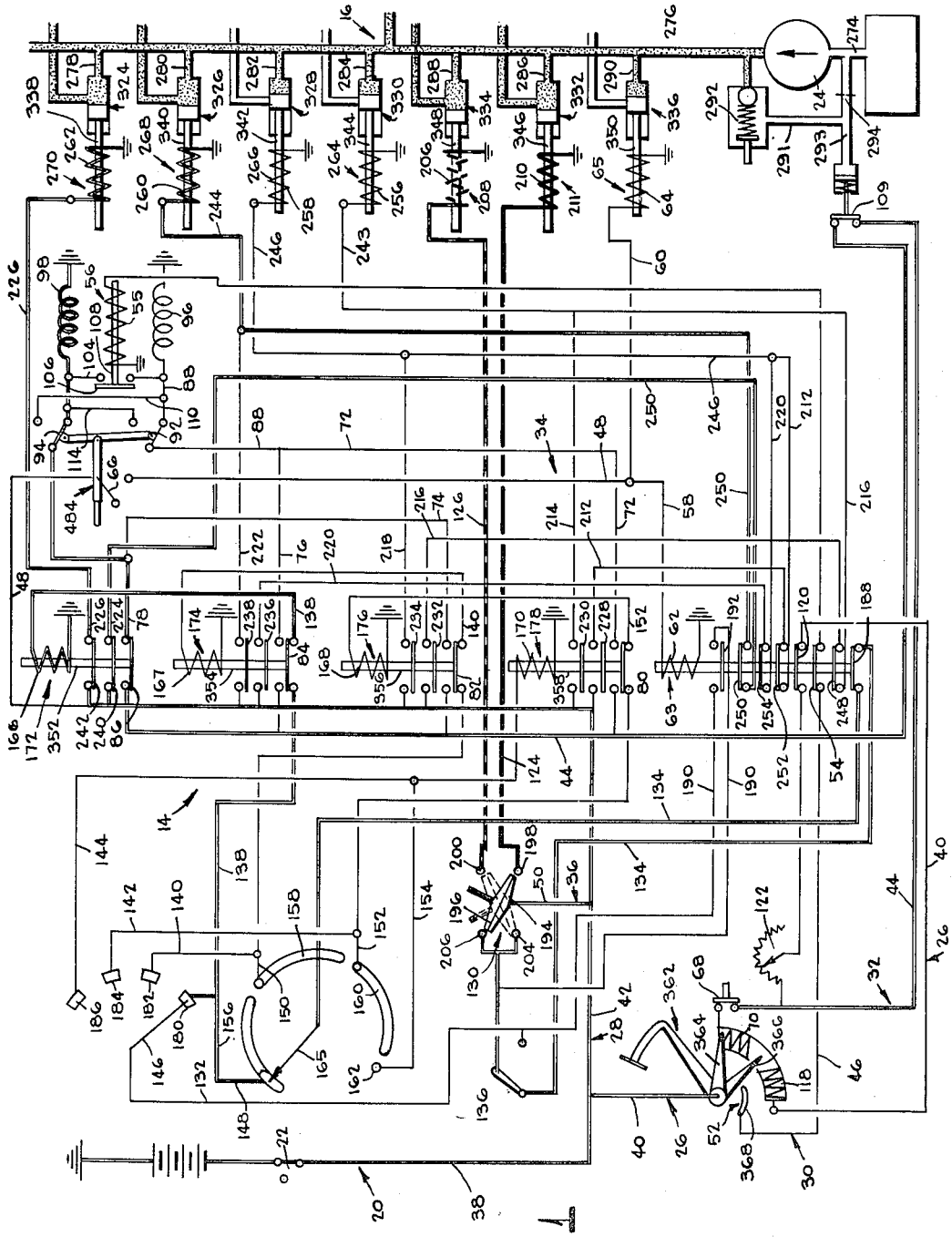

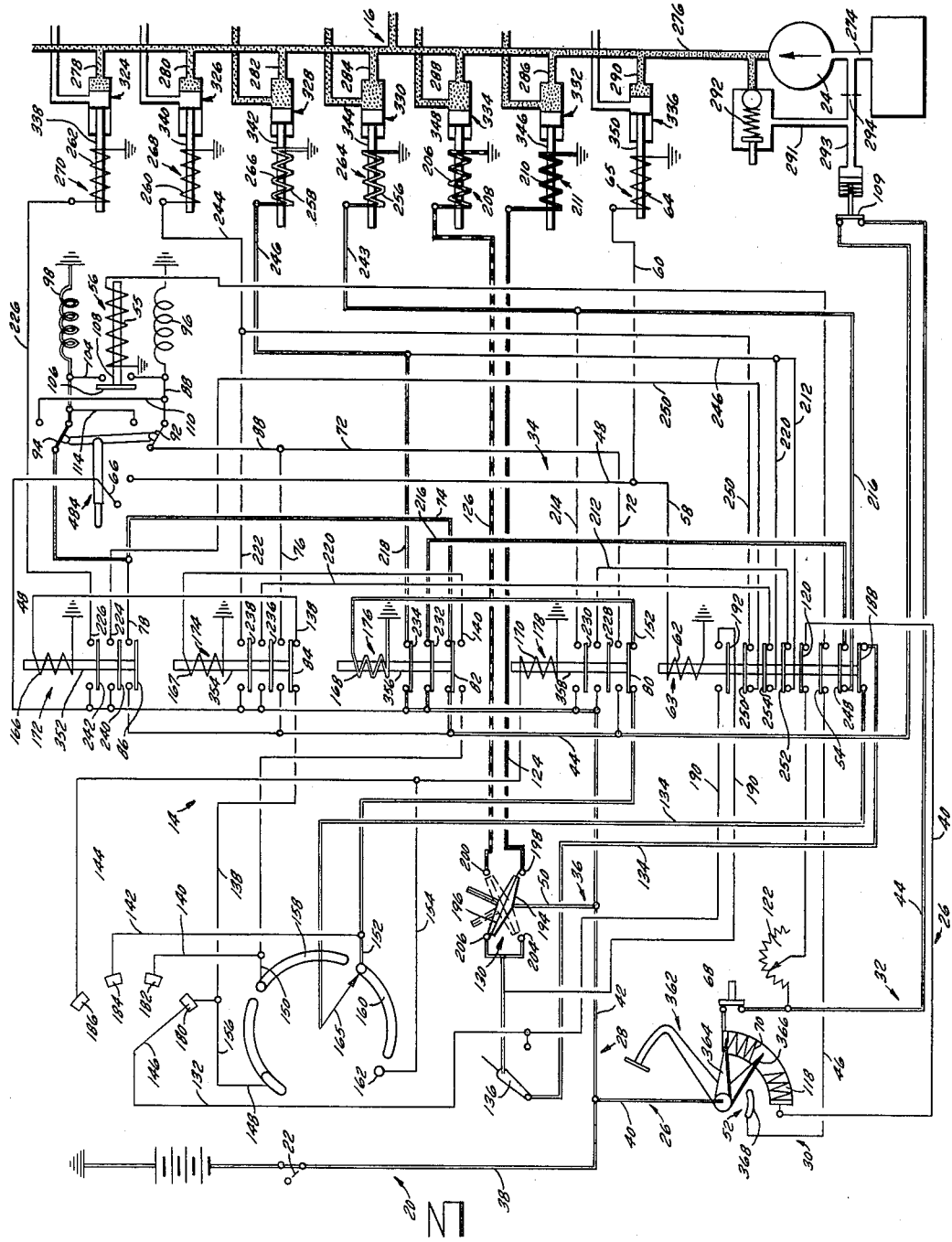

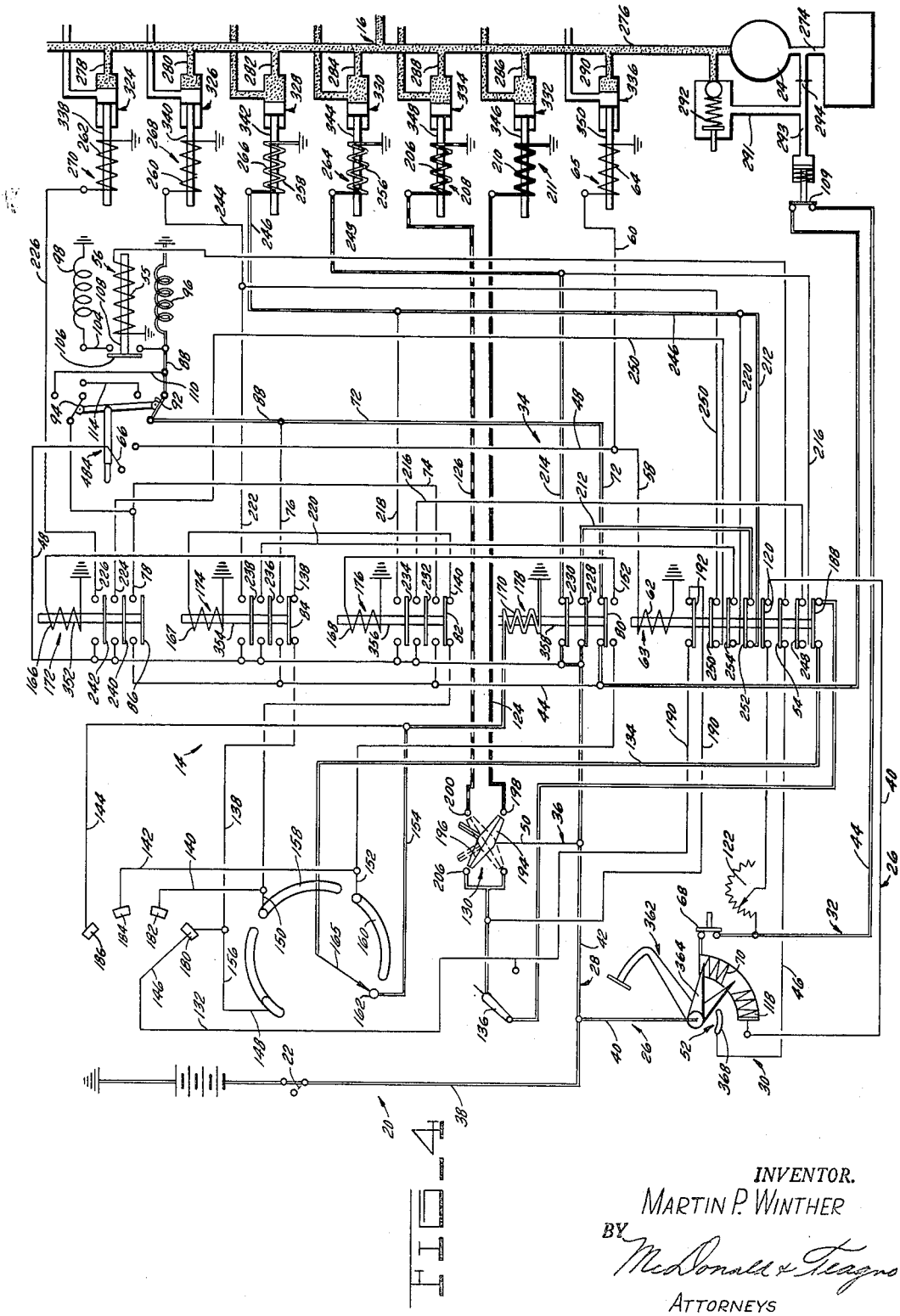

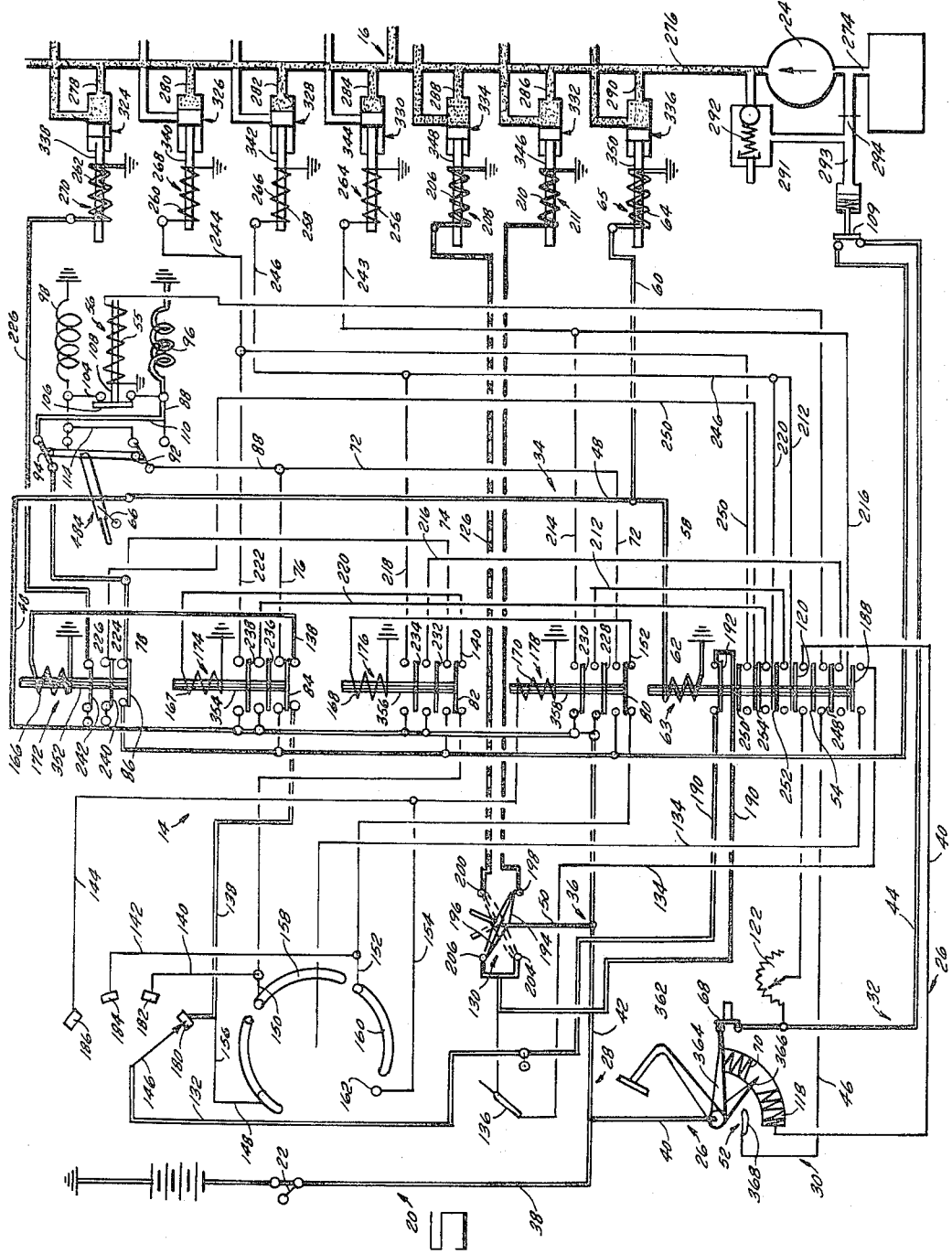

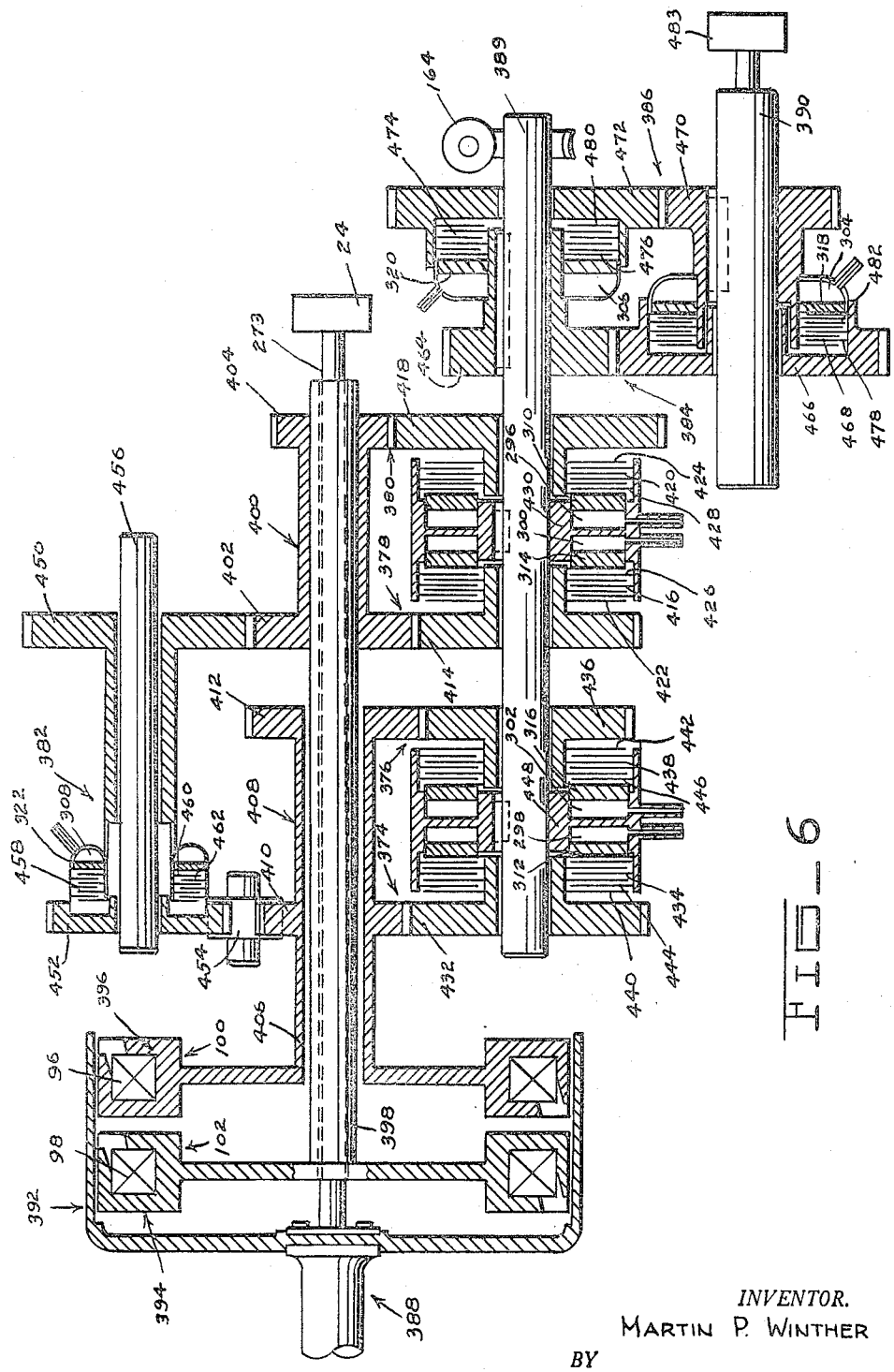

United States Patent Office 2,728,243
Patented Dec. 27, 1955

2,728,243

TRANSMISSION CONTROL SYSTEM

Martin P. Winther, Gates Mills, Ohio, assignor, by mesne assignments, to Eaton Manufacturing Company, Cleveland, Ohio, a corporation of Ohio Application March 6, 1952, Serial No. 275,041

26 Claims. (Cl. 74—472)

This invention relates to transmissions for vehicles and more particularly to a control system therefor.

Broadly the invention comprehends the provision of a combined automatic and manual control system for a multiple forward and reverse speed vehicle transmission effective to control the transmission to provide for the desired forward or reverse speed of operation thereof as well as accomplishing a braking of the vehicle to which applied by way of the transmission. A transmission of the type to be controlled by this system is more fully defined in my co-pending application Serial No. 272,375, entitled Multiple Speed Transmission, filed February 19, 1952. The control system includes an electrical network which can be controlled either manually or by way of a speed control governor for the operative control of the change speed mechanisms of the transmission.

Among the principal objects of the invention are the provision of a control system for multiple forward and reverse speed transmissions; that:

1. Is controllable for either manual or governor change speed operation of the transmission;
2. Can effect a transmission braking operation;
3. Provides for automatic change speed operation of the transmission for forward speeds but not for reverse speeds;
4. Provides for the control of a pair of power transmitting electromagnetic clutches and a plurality of gear speed control clutches;
5. Provides for a braking of the transmission during a forward speed operation of the vehicle to which the transmission is applied through the simultaneous operation of the power transmitting clutches and for braking in reverse by shifting from one of the power transmitting clutches to the other power transmitting clutch;
6. Is effective to control a transmission having eight forward and reverse speeds; and
7. Consists of an electrical network including a plurality of interconnected circuits either automatically or manually controllable and an hydraulic system controlled by the circuits of the electrical network.

Other objects and advantages of the invention will appear from the following description taken in connection with the drawings forming a part of the specification, and in which:

Fig. 1 is a schematic illustration of a control system for a multiple forward and reverse speed transmission with the controls thereof set for first and fifth forward speeds of operation of a transmission to be controlled thereby;

Fig. 2 is a schematic illustration of the system of Fig. 1 with the controls thereof set for second and sixth forward speeds of operation of the transmission controlled thereby;

Fig. 3 is a schematic illustration of the system of Fig. 1 with the controls thereof set for third and seventh forward speeds of the transmission controlled thereby;

Fig. 4 is a schematic illustration of the system of Fig. 1 with the controls thereof set forth for fourth and eighth speeds of operation of the transmission controlled thereby;

Fig. 5 is a schematic illustration of the system of Fig. 1 with the controls thereof set for a reverse speed of operation of the transmission controlled thereby; and Fig. 6 is a schematic illustration of a transmission to be controlled by the system of Figs. 1 through 5.

Similar reference characters indicate corresponding parts throughout the several views of the drawings.

This control system was devised primarily so as to provide an effective means for controlling in a combined automatic and manual manner a transmission of the multiple forward and reverse speed type disclosed and more amply defined in my co-pending application Serial No. 272,375.

The system consists chiefly of an electrical network including a plurality of interconnected circuits whereby through the controlled simultaneous opening and closing various of the circuits, the desired operational control of members of a transmission to be gear speed changed is accomplished. In the main, the system controls the operation of a pair of electromagnetic power transmitting clutches comprising part of the transmission and a plurality of control clutches operative to put into or remove from motion any of several gear trains. Provision is made for either the automatic or manual control of the transmission in its various forward speeds and solely for the manual control of the transmission in reverse. Furthermore, provision is had for the controlled simultaneous operation of both of the power transmitting clutches so as to afford, in the case of the type of transmission herein to be controlled, a braking operation of the transmission for the forward changed speed operation thereof. As a means of automatically controlling the system for the desired automatic operation of the transmission to be associated therewith a governor is driven preferably from the intermediate output shaft of the transmission. The clutches operative to control the operation of the several gear trains of the transmission are preferably hydraulic fluid operated as supplied pressure fluid from an oil pump driven off the transmission or the power plant associated with the transmission, said hydraulic fluid is supplied to the individual clutches being solenoid controlled in accordance with the manipulation of the control system.

Referring to the drawings for more specific details of the invention 10 represents generally a control system, Fig. 1, for a multiple forward and reverse speed transmission 12, Fig. 6.

Control system 10 comprises an electrical network 14 and a hydraulic pump system 16, with the network being supplied current from an electrical source of power, such as a battery 18 and which includes a major circuit 20 controlled as by a switch 22, which may preferably be an engine ignition switch. The hydraulic system 16 is supplied fluid under pressure from a pump 24.

The major circuit 20 includes prime circuits 26, 28, 30, 32, 34 and 36 which are all fed current from the common electrical source, battery 18. Current from battery 18 flows by way of conductor 38 in which switch 22 is located and thence to branch conductors 40 and 42 connected thereto, with branch conductor 40 forming a part of circuit 26 and branch conductor 42 forming a part of circuit 28.

Branch conductors 44 and 46 forming respectively parts of circuits 30 and 32, are fed current thereto through the connection thereof with branch conductor 40.

Branch conductors 48 and 50, forming respectively parts of circuits 34 and 36, are fed current thereto through the connection thereof with branch conductor 42.

Circuit 30 includes in addition to conductor 46 thereof, a normally open brake pedal actuated switch 52, and a normally closed reverse contactor controlled switch 54 connected in the conductor 46 and a coil 55 of solenoid 56 connected at the terminus of conductor 46.

Circuit 34, designated the reversing circuit, includes in addition to conductor 48, branch conductors 58 and 60 having connected respectively at the termini thereof a coil 62 of reverse contactor solenoid 63 and a coil 64 of reverse solenoid 65 and said circuit is controlled as by a manually operable switch 66 arranged in conductor 48.

Circuit 32 includes, in addition to conductor 44, an engine throttle controlled switch 68, a clutch resistance 70, branch conductors 72, 74, 76 and 78 all connected to conductor 48, switches 80, 82, 84 and 86 in the respective conductors 72, 74, 76 and 78, conductors 88 and 90 connected respectively to a juncture of conductors 72 and 76 and a juncture of conductors 74 and 78, interconnected and simultaneously operable switches 92 and 94 controlling the flow of current through the respective conductors 88 and 90, and coils 96 and 98 constituting the coils for the power transmitting clutches 100 and 102 of transmission 12 connected at the termini of the respective conductors 88 and 90. A conductor 104 is connected between the conductors 88 and 90 intermediate the lengths thereof and current flow therethrough is controlled as by a switch 106 therein. The switch 106 is connected to the armature 108 of solenoid 56 so as to be actuated thereby. An hydraulic fluid pressure actuated switch 109 arranged in conductor 44 also serves to control the flow of current in circuit 32.

A conductor 110 connected at one end to conductor 88 intermediate the connection of switch 92 and conductor 104 terminates in a switch contactor terminal 112 adapted to be engaged by switch 94 for one position of movement thereof. A conductor 114 connected at one end to conductor 90 intermediate the connection of switch 94 and conductor 104 terminates in a contactor terminal 116 adapted to be engaged by switch 92 for one position thereof.

Circuit 26 includes in addition to conductor 40, a braking resistance 118, a reverse contactor switch 120, and a brake adjustment rheostat 122 arranged in series in the conductor 40 with the terminus of the conductor 44, opposite from its connection with conductor 38.

The circuit 36 includes, in addition to conductor 50, parallel branch conductors 124, 126 and 128, switch 130, conductors 132 and 134 alternately connectable with conductor 128 by switch 136 movable therebetween, conductors 138, 140, 142 and 144 each separately connectable with conductor 132 by way of a pivotal manually operable switch 146, and conductors 148, 150, 152 and 154 each connected at one end thereof respectively to conductors 138, 140, 142 and 144 and terminating at their other end in contactors 156, 158, 160 and 162 providing for the separate connection thereof with conductor 134 by way of a governor 164 controlled switch 165. The conductors 138, 140, 142 and 144 terminate at one end respectively in coils 166, 167, 168 and 170 of solenoids 172, 174, 176 and 178 and at their opposite ends respectively in contactors 180, 182, 184 and 186. Normally closed switch 188 is arranged in conductor 134 for controlling the current flow therethrough, whereas switches 80, 82 and 84 which are operative to control the flow of current respectively through conductors 72, 74 and 76 also operate to control in another position the flow of current through conductors 138, 140 and 142. A conductor 190 is connected to conductor 132 by passing the switch 136 and the flow of current therethrough is controlled by a normally open switch 192.

Switch 130 includes a pair of blades 194 and 196 extending from the pivot point thereof for alternate engagement of blade 194 with the respective contactor terminals 198 and 200 of conductors 124 and 126 and with blade 196 alternately engageable with a pair of spaced contactors 202 and 204 connected to conductor 128. Conductor 124 terminates in a coil 206 of a solenoid 208 and conductor 126 terminates in a coil 210 of a solenoid 211.

Circuit 28 includes, in addition to conductor 42, parallel conductors 212, 214, 216, 218, 220, 222, 224 and 226, switches 228, 230, 232, 234, 236, 238, 240 and 242 arranged respectively in the conductors 212, 214, 216, 218, 220, 222, 224 and 226 controlling the flow of current therethrough, conductors 243 and 244 connected respectively to the junction of conductors 214 and 216 and the junction of conductors 222 and 224 oppositely from the connection of the conductors 214, 216, 222 and 224 with conductor 42, and a conductor 246 connected to conductor 220 and at the junction of conductors 212 and 214. A normally closed switch 248 is arranged in conductor 216 intermediate the switch 232 and the junction of conductor 214 with conductor 216.

A normally closed switch 250 is arranged in conductor 224 intermediate the switch 240 and the junction of conductors 222 and 224 and normally closed switches 252 and 254 are arranged respectively in the conductors 212 and 220 intermediate the respective switches 228 and 236 and their junction with one another.

The conductors 243, 246, 244 and 226 terminate oppositely from their connection with their other associated conductors in coils 256, 258, 260 and 262 of solenoids 264, 266, 268 and 270.

The hydraulic system 16 includes hydraulic pump 24, driven preferably from a shaft 273 connected directly to the input member of the transmission 12, inlet and outlet conduits 274 and 276 for the pump, a plurality of branch conduits 278, 280, 282, 284, 286, 288 and 290, a bypass conduit 291 connected in communication between the inlet and outlet conduits of the pump having therein a spring pressed one-way valve 292 inhibiting flow of fluid from the inlet to the outlet conduits of the pump while permitting flow in the opposite direction. The switch 109 is adapted to be actuated by the fluid pressure in a branch conduit 293 connected in communication with bypass conduit 291. An orifice 294 is arranged in bypass conduit 291 intermediate branch conduit 293 and inlet conduit 274 providing for a differential pressure build up in the bypass conduit effecting control of switch 109.

Conduits 278, 280, 282, 284, 286, 288 and 290 terminate in pressure cylinders 296, 298, 300, 302, 304, 306 and 308 having therein fluid pressure actuated pistons 310, 312, 314, 316, 318, 320 and 322. Flow control valves 324, 326, 328, 330, 332, 334 and 336 are arranged in the respective conduits 274, 276, 278, 280, 282, 284 and 286 controlling the flow of fluid between the pump and the pistons to be actuated thereby.

Armatures 338, 340, 342, 344, 346, 348 and 350 of the respective solenoids 270, 268, 266, 264, 211, 208 and 64 are directly connected to the control valves 324, 326, 328, 330, 332, 334 and 336 for the operative control thereof.

Switches 86, 240, 242 are connected to an armature 352 of solenoid 172 for the controlled operation thereof. Likewise switches 84, 236, 238 are connected to an armature 354 of solenoid 174 for the controlled operation thereof.

An armature 356 of solenoid 176 has switches 82, 232 and 234 connected thereto permitting of the control thereof through the movement of the armature. Armature 358 of solenoid 178 likewise controls switches 80, 228 and 230 connected thereto for the controlled operation thereof.

An armature 360 of solenoid 63 has connected thereto switches 54, 120, 192, 248, 250, 252 and 254 which are actuated upon movement of said armature.

The clutch resistance 70 in conductor 44 of circuit 32, the braking resistance 118 in conductor 40 of circuit 26 and switch 30 in conductor 46 of circuit 30 are simultaneously controlled by a pivotal control pedal 362 including a pair of angularly spaced current conducting arms 364 and 366. Arm 364 forms a current connecting link for circuit 32 and arm 370 forms a current conducting link for circuits 26 and 28 wherein the extremity of arm 364 is engageable with and movable across resistance 70 whereas the extremity of arm 366 is engageable with and across resistance 118 and an intermediate point of arm 366 is adapted to be engageable with a contactor terminal 368 arranged in conductor 46 of circuit 30. Arm 366 and contactor terminal 368 together comprise switch 52.

Transmission 12, shown substantially by Fig. 6, adapted to be operated by the control system of Figs. 1 through 5, and more fully disclosed by my copending application Serial No. 272,375 comprises basically in addition to the power transmitting electromagnetic clutches 100 and 102, gear sets 374, 376, 378 and 380, reverse gear cluster 382, auxiliary gear sets 384 and 386, and input, intermediate and output shafts 388, 389 and 390 respectively. Input shaft 388 has affixed thereto a drum member 392 constituting an input or driving member of both clutches 100 and 102, adapted to be suitably driven from an engine.

Clutches 102 and 100 are preferably of the eddy current electromagnetic type and comprise respectively in addition to the input member 392, rotors or output members 394 and 396, and coils 98 and 96. Output member 394 includes an output quill shaft 398 having a gear cluster 400 fixedly secured thereon, comprising axially spaced gears 402 and 404 whereas output member 396 includes a quill shaft 406, encircling shaft 398, having a gear cluster 408 thereon, comprising axially spaced gears 410 and 412.

Gear 402 constituting a part of gear set 378 meshes with a gear 414, forming the other part thereof, and gear 414 is in turn adapted to be coupled to intermediate shaft 389 by way of a friction clutch 416. Gear 404 of gear cluster 400 constituting a part of gear set 380 meshes with a gear 418, forming the other part thereof and 418 is in turn adapted to be coupled to intermediate shaft 389 by way of a friction clutch 420. Both clutches 416 and 420 as shown are of the multiple plate type and include input plates 422 and 424 connected to the respective gears 414 and 418, and output plates 426 and 428 respectively connected to a common support 430 having keyed relation with intermediate shaft 389.

Gear 410 constituting a part of gear set 374, meshes with a gear 432, forming the other part thereof, and gear 432 is in turn adapted to be coupled to intermediate shaft 389 by way of a friction clutch 434. Gear 412, of gear cluster 400, constituting a part of gear set 376, meshes with a gear 436, forming the other part thereof, and gear 436 is in turn adapted to be coupled to intermediate shaft 389 by way of a friction clutch 438. Both clutches 434 and 438 are identical to clutches 416 and 418 and include input plates 440 and 442 connected to the respective gears 432 and 436, and output plates 444 and 446 respectively connected to a common support 448 having keyed relation with intermediate shaft 389.

Reverse gear cluster 382 includes a gear 450 having meshing relation with 402 and a gear 452 having meshing relation with a reverse idler gear 454, said idler gear in turn meshing with gear 410 of a gear cluster 408. Gears 450 and 452 are supported for rotation on a jack shaft 456 and adapted to be coupled together by a friction clutch 458. The clutch 458 includes engageable plates 460 and 462 connected respectively to the gears 450 and 452.

Auxiliary gear sets 384 and 386 as combined constitute an auxiliary gear box for transmission 12. Gear 464 constituting a part of gear set 384 is keyed to intermediate shaft 389 and has meshing engagement with a gear 466 forming the other part of gear set 384 and gear 466 is in turn adapted to be coupled by way of friction clutch 468 to a gear 470 keyed to output shaft 390. Gear 470, constituting a part of gear set 386, meshes with a gear 472 forming the other part of gear set 386, and gear 472 is in turn adapted to be coupled to gear 464 by way of friction clutch 474. Clutches 468 and 474 are of the multiple plate type and include plates 476 and 478 connected respectively to gears 464 and 466 and output plates 480 and 482 connected respectively to gears 472 and 470.

Friction clutches 416, 420, 434, 438, 458, 468 and 474 are respectively actuated by the pistons 314, 310, 312, 316, 322, 318 and 320, operable in the pressure cylinders which are supplied fluid under pressure from the hydraulic pump 24.

With the gear sets so arranged in association with the input, intermediate and output shafts and as controlled by the various hydraulically actuated clutches therefor, eight forward as well as eight reverse speeds are obtainable. The eight forward and reverse speeds are achieved through the predetermined sizing of the various gears relative one to the other such as for example wherein meshing gears 410 and 432 are provided with 25 and 45 teeth respectively, meshing gears 412 and 426 are provided with 38 and 32 teeth respectively, meshing gears 402 and 414 are provided with 31 and 39 teeth respectively, meshing gears 404 and 418 are provided with 19 and 51 teeth respectively, meshing gears 464 and 466 are provided with 19 and 62 teeth respectively, meshing gears 472 and 470 are provided with 45 and 36 teeth respectively, reverse gear 452 is provided with 31 teeth and reverse gear 450 is provided with 39 teeth.

With the switch 22 open the entire control system is dead and thus incapable of operation.

Resistances 70 and 118 are of a type made to carry the heavy wattage and great number of operations required, with resistance 70 being utilized to vary the current to either of the clutches 100 or 102 and for inching of the transmission 12 in low gear. In a great many of cases, resistance 70 need not be used even for starting the vehicle to which the control system 10 and transmission 12 are applied. Switch 68 in conductor 44 of circuit 32 is normally open when the throttle, for an engine for powering the transmission and vehicle, is closed at engine idle and is adapted to be closed by movement of the throttle for the acceleration of the engine regardless of the position of the so-called clutch pedal 362.

Upon depressing the pedal 362 about half of its maximum permissible movement, resistance 70 will be completely interposed in circuit 32 thus reducing the current value, to the one or the other of the clutches, to what is normally called a threshold value, which means that about sufficient torque is applied to the electromagnetic clutch then in operation to overcome friction of the driven member.

When the pedal 362 is depressed beyond substantially the midpoint of operation thereof switch 52 will be closed, through the movement of arm 366 of the pedal engaging contact terminal 368, thus preparing the entire control system for braking of the transmission in accordance with the following sequence of events:

With switch 52 of circuit 30 moved to closed position and switch 54 therein remaining in normally closed position coil 55 will be energized operating to effect a movement of armature 108 and switch 106 connected thereto. Switch 106 as closed completes conductor 104 permitting of the flow of current to both coils 96 and 98 of clutches 100 and 102 by way of conductor 104 to the respective conductors 88 and 90 for the coils 96 and 98. At this stage both clutch coils 96 and 98 will receive an equal excitation potential and will be in parallel regardless of which of the switches 80, 82, 84, or 86 are closed. If at this time pedal 362 is depressed beyond its midpoint of movement after the initial closing of switch 52, resistance 118 becomes engaged by the end extremity of arm 366 whereby the current to both clutches 100 and 102 is increased as the pedal 362 is further depressed. With both clutches 100 and 102 energized at the same time while the transmission is in any of its forward speeds of operation a brake effect on the vehicle is achieved since the clutches 100 and 102, by way of the gear sets driven therefrom, apply a resultant braking force upon the intermediate shaft 389.

Rheostat 122 in conductor 40 of circuit 26 is used for presetting the desired severity of braking action and can be manually adjusted by the driver of the vehicle. The switch 120 in conductor 40 of circuit 36 is operable to open circuit 26 and thus inhibit any braking operation when the appropriate shift controls of the control system are moved to a position providing for a reverse operation of the transmission 12.

Hydraulic fluid operated switch 109 is operable to be opened upon a pressure drop in the hydraulic system during shifting operations between the friction clutches such that the clutches 100 and 102 are temporarily de-energized so that the energy due to shifting speeds is absorbed in the clutches as they are not energized until after the friction clutches are closed.

The governor 164 for controlling the operation of switch 165 is shown by Fig. 6 as being driven from the intermediate shaft 389, the purpose of which will hereinafter appear.

Pump 24 as shown by Fig. 6 is driven from shaft 273, which shaft is in turn connected directly to input shaft 388 of the transmission such that the pump 24 is driven whenever the prime mover for the transmission is operated. As in the case of well-known conventional transmissions now in use, an auxiliary pump 483 is provided to be driven from output shaft 390 so as to assure together with pump 24 hydraulic fluid under pressure for actuating the friction clutches if the engine is running and the vehicle stopped, or the vehicle is moving, and the engine is stopped and/or both the vehicle and the engine are in motion. Pump 483 can be suitably arranged in hydraulic system 16 in any conventional manner for its intended purpose.

Fig. 1 illustrates the control system in a position of operation providing for both the first and fifth forward speeds of operation of transmission 12 with the switch 136 in a position for automatic governor controlled operation of the transmission. It is to be noted that the control for the first and fifth forward speeds of operation of the transmission differ merely in the shifting of manually actuable switch 130 from one position to another thereby providing for either the energization of coil 210 of solenoid 211 or the energization of coil 206 of solenoid 208. As such it is to be understood that the shift to fifth forward speed operation of the transmission will be manually effected only after a fourth forward speed operation is attained.

With the switch 22 closed providing for the flow of current in circuit 20, from battery 18, and with throttle switch 150 actuated to a closed position, current flows through conductor 38, thence in independent parallel paths through conductors 40 and 42 of the respective circuits 26 and 28. Current is then carried by conductor 42 to conductor 50 of circuit 36, from where it passes by way of switch 130, in full line current conducting position for the flow of current by way of arm 194 to conductor 124 for the energization of coil 206 of solenoid 208. Simultaneously with the current flow in arm 194 of switch 130, current is carried by arm 196 of the switch to conductor 128 by way of the arm engaging contact terminal 206 of the conductor 128. Current in conductor 128 flows therethrough, by way of switch 136, in full line position (for governor operation as compared to manual operation) to conductor 134, through normally closed switch 188 in conductor 134, governor switch 165, contactor 156, conductor 148, conductor 138, and through normally closed switch 84 in conductor 138 to coil 166 for the energization thereof. Upon the energization of coil 166 of solenoid 172, the armature 352 thereof and the switches 86, 240, and 242 connected thereto are moved in unison to close the respective conductors 78, 224 and 226 permitting of the flow of current therethrough.

Through the closing of switches 240 and 242 and with current available in conductor 42, current flows from conductor 42 to the conductors 224 and 226 connected in parallel thereto, providing in the case of conductor 226 for the energization of coil 262 of solenoid 270 and in the case of conductor 224 for the flow of current to coil 260 of solenoid 268 for the energization thereof by way of conductor 244 connecting coil 260 to conductor 224 and through normally closed switch 250 in conductor 224.

Current which is fed to conductor 38 flows therefrom to conductor 44 of circuit 32 by way of pedal arm 364, and resistance 70, through closed throttle switch 68 in conductor 44, conductor 78, conductor 90 and closed switch 94 in conductor 90 to coil 98, of clutch 102 for the energization thereof.

The energization of coils 210, 260, 262 and 90 provide respectively for the movement of armatures 346, 340, and 338 and control valves 332, 326 and 324 connected thereto and for the coupling together of drum 392 and output member 394 of the transmission.

The movement of valves 332, 326 and 324 serve to permit of the flow of hydraulic fluid under pressure from the pump 24, through conduit 276, and the respective conduits 286, 280 and 278 for the actuation of the pistons 318, 312 and 310 and the consequent actuation respectively of friction clutches 468, 434 and 420 thereby.

With power being delivered by way of clutch 102 from the vehicle engine, and with gear set 380 operating to transmit power from shaft 398 to shaft 389 by way of closed friction clutch 420 and with gear set 384 operating to transmit power from shaft 389 to output shaft 390 by way of closed clutch 468, a first forward speed of operation of the transmission is obtained.

The fifth speed of operation is obtainable as shown by Fig. 1 after a fourth forward speed has been obtained through the manipulation of manual switch 130 to its dotted line position wherein arm 194 contacts terminal 200 and arm 196 contacts terminal 204 thereby providing for current flow in conductor 126 (dotted lines) rather than in heavy solid lined conductor 124 such that coil 210 of solenoid 211 is de-energized and coil 206 of solenoid 208 is energized. As such, friction clutch 474 is closed and friction clutch 468 is opened and power delivered by shaft 389 is transmitted therefrom by way of gear 464 and its clutched relation through clutch 474 to gear 472 and thence by way of gear set 386 (meshing gears 472 and 470) to output shaft 390 thereby effecting fifth forward speed of operation of the transmission.

Fig. 2 illustrates the control system in position for second and sixth forward speeds of the transmission.

The control system for second and sixth forward speeds of the transmission is at variance with the control for first and fifth speeds in that with the transmission set for automatic governor control the governor switch 165 comes into engagement with contact terminal 158 thereby providing for the flow of current by way of switch 165, conductor 150, conductor 140, and normally closed switch 82 in conductor 140 to coil 167 of solenoid 174 for the energization thereof. Upon coil 167 being energized armature 356 of solenoid 174 is actuated effective to actuate, in unison switches 84, 236 and 238 connected thereto, to closed position whereby current flowing in conductor 42 of circuit 28 is fed through parallel conductors 220 and 222 connected to conductor 42 closed by switches 236 and 238. Switch 84 in closed position provides for the flow of current through conductor 76 as supplied thereto from conductor 44 of circuit 32.

Current fed to conductor 222 flows therefrom to conductor 244 and coil 260 of solenoid 268 connected thereto whereas current fed to conductor 220, passes through normally closed switch 254 in conductor 220, to conductor 246 for the energization of coil 258, conductor 246 for the energization of coil 258, of solenoid 266, connected to conductor 246.

Conductor 76 feeds the current therein to conductor 88 connected thereto from whence it passes by way of closed switch 92 in conductor 88 to coil 96, of clutch 100, for the energization thereof.

Similarly to the setting of the control system shown by Fig. 1 relative to first and fifth speeds, the switch 130 as shown in full lines provides for flow of current, as fed thereto by way of conductor 50 of circuit 36, to conductor 124 whereby coil 210, of solenoid 211, connected thereto is energized.

The energization of coil 210, 258, 260 and 96 provide respectively for the movement of armatures 346, 342 and 340 and control valves 332, 328 and 326 connected thereto and for the coupling together of drum 392 and output member 396 of the transmission.

The movement of valves 332, 328 and 326 serves to permit of the flow of hydraulic fluid under pressure from the pump 24, through conduit 276, and the respective conduits 286, 282 and 280 for the actuation of the pistons 318, 314 and 312 and the consequent actuation respectively of the friction clutches 468, 416 and 434 thereby.

With power being delivered by way of clutch 100 between the respective input and output members 392 and 396 thereof, and with gear set 374 serving to transmit power from shaft 406 to shaft 273 by way of closed friction clutch 434 and with gear set 384 operating to transmit power from shaft 273 to output shaft 390 by way of closed clutch 468, a second forward speed of operation of the transmission is obtained.

Assuming that the driver of the vehicle is aware of the attainment of the fourth range of forward speed of the vehicle and has shifted switch 130 to the dotted line position of Fig. 1, it will consequently result as related to the dotted line position of switch 130 in Figure 2 that with the governor switch 165 engaging contactor terminal 158 a sixth forward speed control is had thus providing for the automatic passage from fifth to sixth forward speed of the transmission as controlled by the governor switch of control system 10.

Third and seventh speeds of control of transmission 12 are achieved by the positioning of the elements of control system 10 as shown by Fig. 3.

For third forward speed control of transmission 12 governor switch 165, in an automatic control of the transmission, advances to a position wherein it engages contactor terminal 160 and thus provides for the flow of current as fed to switch 165 to contactor 160 and conductor 152 connected thereto. Current in conductor 152 flows therefrom through closed switch 80 therein, to coil 168, of solenoid 176, for the energization thereof. Upon coil 168 being energized armature 356 of solenoid 176, associated therewith is actuated. As the armature 358 is actuated, switches 82, 232 and 234 connected thereto, are moved therewith in unison effective to close the respective conductors 74, 216 and 218 in which they are located. With conductors 216 and 218 closed and with current being fed thereto from current carrying conductor 42 of circuit 28, current is fed through conductor 216 by way of normally closed switch 248 connected therein and conductor 243 connected thereto to coil 256 of solenoid 264 for the energization thereof. Simultaneously therewith current fed to conductor 218 is transmitted therefrom, by way of conductor 246 connected thereto, to coil 258 of solenoid 266, for the energization thereof.

The closing of switch 82 provides for the flow of current in conductor 74 as fed from conductor 44 connected thereto. Current in conductor 74 flows therefrom to conductor 90 connected thereto and through closed switch 94 connected therein to conductor 90 whence conductor 90 transmits said current to coil 98 of clutch 102, connected thereto, for the energization thereof.

Similarly as in the case of the illustration of control system 10 as shown by Fig. 10, the full line position of switch 130 provides for current flow to coil 210, of solenoid 211, for the energization thereof and when in dotted line position the provision for current flow to coil 206 of solenoid 208 for the energization thereof.

With the coils 210, 256 and 258 energized the armatures 346, 344 and 342 associated respectively with coils 210, 256 and 258 are actuated resulting in the movement of control valves 332, 330 and 328 connected respectively thereto whereas coil 98 so energized results in the coupling together of drum 392 and output member 394 of the transmission.

The movement of valves 332, 330 and 328 serve to permit of the flow of hydraulic fluid under pressure from the pump 24, through conduit 276 and the respective conduits 286, 284 and 282 for the actuation of the pistons 318, 316 and 314 and the consequent actuation respectively of friction clutches 468, 438 and 416.

With power being delivered by way of clutch 102 from drum 392 to output member 394, and with gear set 378 operating to transmit power from shaft 398 to shaft 389 by way of closed friction clutch 416 and with gear set 384 operating to transmit power from shaft 389 to output shaft 390 by way of closed clutch 468, a third forward speed of operation of the transmission is obtained. The seventh forward speed control is obtained when the switch 130 is in dotted line position of Fig. 3 thereby providing for the engagement of friction clutch 474 serving to couple the intermediate shaft 389 by way of gear set 386 with output shaft 390.

Fourth and eighth forward speeds of operation of the control system 10 are illustrated by Fig. 4 wherein under the influence of the speed of intermediate shaft 389, the governor controlled switch 165 driven thereby has moved to a position to conduct current to contactor terminal 162. Current transmitted to contactor terminal 162 passes therefrom to conductor 154 connected thereto for the energization of coil 170, of solenoid 178, connected thereto. Upon the energization of coil 170, armature 358 associated therewith is actuated resulting in moving in unison switch 80, 228 and 230 connected thereto thus providing for the closing of the respective conductors 72, 212 and 214.

With current transmitted to parallel conductors 212 and 214 by way of conductor 42, of circuit 28, to which they are connected, conductor 214 provides for the flow of current therethrough and transmitted therefrom to conductor 243, connected thereto, for the energization of coil 256, of solenoid 264, connected to conductor 243. Current in conductor 212 is transmitted therethrough through normally closed switch 252 therein, to conductor 246 whence it is fed to coil 258, of solenoids 266, for the energization thereof.

With current flowing in conductor 44 of circuit 32 and with switch 80 closed, current flows from conductor 44 to and through conductor 72 connected thereto from whence it flows, by way of conductor 88 connected thereto and closed switch 92 in conductor 88, of coil 96, of clutch 100, for the energization thereof.

It is to be noted in both cases of third and fourth forward speeds of control of system 10 that the coils 256 and 258 are in the same condition electrically whether switch 146 or 165 is in third or fourth speed control position, the difference in the overall circuit being that there is a change in the excitation of coils 96 and 98 from one to the other.

Switch 130 is shown in full line position in Fig. 4 effective to provide for current flow by way of conductor 124 to coil 210, of solenoid 211, for the energization thereof and when in dotted line position arm 194 transmits current to conductor 126 for flow therethrough to coil 206, of solenoid 208, for energization thereof.

The energization of coils 210, 256 and 258 provides for the actuation of the respective armatures 346, 344 and 342 and the consequent movement of the respective flow control valves 332, 330 and 328 connected thereto. As such the valves 332, 330 and 328 are moved to a position as shown by Fig. 4 permitting of the flow of hydraulic fluid under pressure from pump 24, through conduit 276, and the respective conduits 286, 284 and 282 connected thereto controlled respectively by valves 332, 330 and 328 thus providing for the actuation respectively of pistons 304, 302 and 300. The actuation of pistons 304, 302 and 306 actuate in turn the respective friction clutches, of the transmission, 468, 316 and 314.

Coil 96 as energized effects a coupling together of the input and output members 392 and 296 of clutch 100.

Upon clutches 468, 316 and 314 being actuated to closed position and with input and output members 392 and 396 of clutch 100 in coupling relation power delivered to drum 392 is transmitted to shaft 406 by way of member 396 of clutch 100. Gear set 376 by way of closed clutch 438 transmits power from shaft 406 to intermediate shaft 389 and gear set 384 transmits power from shaft 389 to output shaft 390 by way of closed clutch 468. This controlled power flow through the transmission provides for the fourth forward speed of operation thereof.

The eighth forward speed differs from the fourth solely in that the gear set 386 by way of closed clutch 474 transmits power from shaft 389 to shaft 390. The control hereof is achieved wherein the manual operated switch 130 has been moved to provide for current flow to conductor 126 instead of 124 thereby effecting the energization of coil 206, of solenoid 208, and the subsequent actuation of clutch 474 to closed position.

It is to be understood in the case of the forward speeds, fifth through eighth that the singular manual movement of switch 130 at the time fourth forward speed has been attained serves to provide thereafter of the successive stage of forward speed control fifth through eighth either as controlled manually by switch 146 when switch 136 is moved to position for manual control of the control system, that is switch 136 transmits current between conductors 128 and 132 or automatically by governor controlled switch 165.

In moving switch 130 to provide for shaft control between fourth and fifth speeds, shaft 389 will be immediately slowed down and since the governor 164 is driven therefrom switch 165 driven therefrom will move back from fourth to first forward speed governor contactor position. Thus if the throttle of the engine, from which the transmission is driven, is opened, the vehicle with which the transmission and engine are associated will be accelerated under the control of the fifth through eighth forward speeds of control of the transmission as the governor switch passes successively into and across engagement with contactor terminals 156, 158, 160 and 162.

Fig. 5 illustrates the condition of the control system 10 for effecting a reverse control of the transmission 12, that is switches 66, 92 and 94 are moved simultaneously under the control of lever mechanism 484 connected therewith. Whereas switch 66 is moved to close conductor 48 of circuit 34, switches 92 and 94 are moved to respectively connect conductor 88 to conductor 114 and conductor 90 with conductor 110.

Current supplied to conductor 48 from conductor 42, connected thereto, provides for the energization of coil 64, of solenoid 65, by way of current being transmitted between coil 64 and conductor 48 by a conductor 60 connected therebetween and transmits current by way of conductor 58 to coil 62, of solenoid 63, for the energization thereof.

The energization of coil 64 provides for the actuation of armature 350 and the consequent movement of valve 336 connected thereto, resulting in permitting of the flow of hydraulic pressure from pump 24 through conduit 276, and conduit 290 to cylinder 308 for the actuation of piston 322 therein. The actuation of piston 302 operates to close friction clutch 458 and thus effect a coupling action between the gears 450 and 452.

Upon the energization of coil 62, of solenoid 63, switches 54, 120, 188, 192, 248, 250, 252, and 254 connected therewith are actuated in unison effective to close switch 192 and open switches 54, 120, 188, 248, 250, 252, and 254. By the closing of switch 192 and the opening of switch 188 the system is so established as to provide solely for manual control in reverse by way of bypassing switch 136 through closed conductor 190 in which switch 192 is arranged connected between conductors 128 and 132. With switch 188 opened current in conductor 134 is disrupted and the governor switch 166 becomes ineffective thereafter so long as switch 188 remains opened. The opening of switches 54, 120, 248, 250, 252 and 254 is provided since in reverse no braking control of the transmission is desired while at the same time it is desired that braking be permitted in the forward speed operation of the transmission.

The reversing operation illustrated by Fig. 5 pertains solely with regards to a reverse speed corresponding to the first forward speed wherein with the switch 146 conducting current from conductor 132 to contactor terminal 180, current is transmitted therefrom to conductor 138 connected thereto for the flow therethrough, by way of normally closed switch 84, to coil 164 of solenoid 172, for the energization thereof. The armature 352 similarly as illustrated in Fig. 1 is actuated and moves switches 86, 240, and 242 connected thereto to close the respective conductors 78, 224 and 226. Current supplied to conductor 226, by way of conductor 42 to which it is connected is in turn supplied to coil 262, of solenoid 270, for the energization thereof. Even though current is simultaneously supplied to conductor 224 closed by switch 240, it is inhibited from flowing therethrough since switch 250 has been actuated to open position as a result of the energization of coil 62.

With the switch 86 in closed position in conductor 78, current supplied to conductor 78, by way of its connection with conductor 44, flows therethrough, to switch 94, and thence by way of switch 94 to and through conductor 110, and through conductor 88 to coil 96 for the energization thereof.

As in the case of the first forward speed, the first reverse speed is obtained with the switch 130 in full line position, Fig. 5, whereby coil 210, of solenoid 211, becomes energized.

The energization of coil 210 provides for the actuation of armature 346 and valve 332 connected thereto permitting of the flow of hydraulic fluid under pressure from pump 24, through conduit 276, and conduit 286 for the actuation of piston 318 in cylinder 304. This actuation of piston 318 provides for the closing of clutch 468.

Coil 262 as energized provides, by way of actuating valve 324 connected to armature 338, for the flow of hydraulic fluid under pressure from the pump to actuate piston 310 in cylinder 296 and thus provide for the closing of clutch 420.

With the clutch 100 engaged and the clutches 420, 458 and 468 closed power flows from shaft 406 of clutch 100, through gear 410 and by way of reverse idler to gear 452, thence through closed clutch 458 to gear 450, from gear 450 to gear 402 meshing therewith, and by way of gear set 380 and closed clutch 420 to shaft 389. The power delivered to shaft 389 is then transmitted by way of gear set 384 and closed clutch 468 to shaft 390. As such a first reverse speed of operation of the transmission is obtained.

The successive first through fourth upstaging reverse speeds of operation are obtained by advancing the manual switch 146 through successive engagement with the contactor terminals 180, 182, 184 and 186 and once the fourth reverse speed is obtained, a movement of the switch 130 to the position providing for flow of current to conductor 126 and the energization of coil 206 and a return of switch 146 to engagement with contactor terminal 180, will provide for a fifth reverse speed of operation. The successive fifth through eighth reverse speeds of operation are then obtainable by the movement of switch 146 once again into engagement successively with contactor elements 180, 182, 184, and 186.

If for instance it is required to perform a bulldozing operation, with a vehicle propelled by the transmission 12, wherein it is desired to move slowly forward and then backward at a much higher rate of speed it is possible for the operator of the vehicle to make such a shift. For example, switches 92 and 94 can be set in the position illustrated by Fig. 1 with the switch 130 in full line position of Fig. 1 whereby a first forward speed is obtained and then the switches 92, 94 and 66 can be moved to reverse speed position of operation of control system 10 as shown by Fig. 5, simultaneously with the shifting of switch 130 to dotted line position of Fig. 5 to thereby effect a fifth reverse speed of operation. This shifting arrangement is entirely practicable because of the capacity of the clutches 100 and 102 to absorb the difference in speed between the first and fifth speeds of operation of the transmission.

Aside from the shift from first forward to fifth reverse speed the operator of the vehicle can select whatever speed desired by moving the manual selector switch 146 at the same time that the switches 92, 94 and 66 are moved.

When it is desired to effect a rocking action of the vehicle in which the transmission is incorporated it is only necessary to shift back and forth the switches 92, 94 and 66 under the influence of lever mechanism 484 whereby clutches 100 and 102 are alternately engaged and the reverse friction clutch 458 is alternately closed and opened. A rocking or alternate forward and reverse operation of the transmission can be accomplished for any established forward or reverse operation of the transmission.

Should it be desired to effect a braking operation of the transmission in the forward speed of operation thereof it is only necessary that the pedal 362 in the case of Figs. 1 through 4 be advanced to a point to close switch 52 whereupon current flows, by way of conductor 46 of circuit 30, and through normally closed switch 54 in conductor 46 to coil 55 for the energization thereof. As energized, coil 55 actuates armature 108 effective to move switch 106 connected thereto to position closing conductor 104 permitting of current flow therethrough between the coils 96 and 98. At this time with current being supplied to either one or the other of the coils 96 or 98 and for example as illustrated by Fig. 1 wherein coil 98 is energized as supplied current from conductor 90 having closed switch 94 therein, the conductor 104 connected to conductor 90 transmit current therefrom to conductor 88 and coil 96 connected thereto resulting in a simultaneous operation of both coils 96 and 98. With both coils 96 and 98 energized and coils 260 and 262 energized as viewed in Fig. 1 a braking reaction is had by way of the gear sets 374 and 380 being coupled by way of the respective closed friction clutches 434 and 420 to the shaft 389 and their respective connection with the output members 396 and 394 of the clutches 100 and 102.

While this form of braking action is obtainable for any and all of the forward speeds when pedal 362 is moved to a point to close switch 52, the comparable braking in reverse is eliminated by way of the control the operation of solenoid 63 effects upon the system especially as it regulates upon switch 66 being closed to open switch 54 and thus disrupt simultaneous operation of clutches 100 and 102 in reverse.

A braking effect in reverse is obtainable merely by shifting the switches 92, 94 and 66 by way of lever mechanism 484 for forward operation of the transmission, that is shifting the drive from clutch 102 to clutch 100.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. Control apparatus, for a transmission having a driven shaft and a plurality of power actuated elements including a first clutch, a second clutch, a third clutch, a fourth clutch, a fifth clutch, a sixth clutch and a seventh clutch, which transmission is driven by a prime mover having associated therewith an accelerator, and a battery, comprising an electrical network including said battery, and a switch adapted to be closed upon depression of the accelerator, power means for actuating the third through seventh clutches, means for energizing the first and second clutches a first circuit in said network for controlling the energization of the first and second clutches, a second circuit in said network for controlling the operation of the power means for actuating the third through sixth clutches, a third circuit in said network for controlling the operation of the power means for actuating the seventh clutch and a fourth circuit in said network for controlling the flow of current in the second circuit.

2. Control apparatus according to claim 1 wherein the first and second clutches are connected in the first circuit and manual switch means in the first circuit provides for the alternate energization of the first and second clutches.

3. Control apparatus according to claim 2 wherein the fourth circuit includes switch means therein for controlling the flow of current therethrough.

4. Control apparatus according to claim 2 wherein a fifth circuit in said network provides for the controlled simultaneous energization of the first and second clutches.

5. Control apparatus according to claim 3 wherein the switch means includes a manually operable switch and a governor controlled switch driven from the driven shaft of the transmission.

6. Control apparatus according to claim 3 wherein a plurality of electrical solenoids are separately connected by the switch means with the fourth circuit.

7. Control apparatus according to claim 3 wherein a plurality of switches in the second circuit are controlled by the fourth circuit.

8. Control apparatus according to claim 3 wherein a plurality of electrical solenoids are connected in the second circuit and a plurality of switches in the second circuit, controlled by the fourth circuit, control the energization of the solenoids connected in the second circuit.

9. Control apparatus according to claim 5 wherein a second manually actuated switch in the fourth circuit controls said circuit for first manual switch or governor controlled switch operation.

10. Control apparatus according to claim 5 wherein a plurality of solenoids are separately connected with the fourth circuit by either the manually operable or governor controlled switches.

11. Control apparatus according to claim 8 wherein a plurality of electrical solenoids are separately connected with the fourth circuit by the switch means therein and wherein the solenoids in the fourth circuit control the operation of respective switches in the second circuit.

12. Control apparatus according to claim 8 wherein there are four solenoids arranged in parallel in the second circuit.

13. Control apparatus according to claim 10 wherein there are four solenoids arranged in parallel in the fourth circuit controlled by either the manually operable or governor controlled switches.

14. Control apparatus according to claim 11 wherein a plurality of switches are connected in the first circuit controlling the flow of current therethrough and wherein the solenoids in the fourth circuit also control the operation of the respective switches in the first circuit.

15. Control apparatus according to claim 14 wherein two electrical solenoids are connected in parallel in the third circuit and wherein one of the solenoids controls the operation of the power means for actuating the seventh clutch.

16. Control apparatus according to claim 15 wherein a manually operated switch controls the flow of current through the third circuit and wherein said switch is connected with the switch means of the first circuit for simultaneous movement therewith.

17. Control apparatus according to claim 15 wherein the first and second clutches are of the electromagnetic type and the coils thereof are arranged in parallel in the first circuit, the solenoids of the fourth circuit are alternately connected in parallel thereon, and the solenoids of the second circuit are connected in parallel therein.

18. Control apparatus according to claim 15 wherein the switch means in the fourth circuit includes a manually operable switch and a governor controlled switch driven from the drive shaft of the transmission, wherein a second manually operable switch is provided in the fourth circuit and wherein switch controlled current conducting means connected in the fourth circuit bypasses the second manually actuated switch in the fourth circuit.

19. Control apparatus according to claim 15 wherein a hydraulic pressure producing means provides hydraulic fluid under pressure for the actuation of the third through seventh clutches, and valves actuated by the respective solenoids of the second circuit and one of the solenoids of the third circuit control, the flow of hydraulic fluid for the actuation of the respective third through seventh clutches.

20. Control apparatus according to claim 15 wherein the transmission to be controlled additionally includes an eighth and and a ninth clutch, two solenoids are alternately connected in parallel in the fourth circuit in parallel to the other solenoids connected therein, and a manually actuated switch in the fourth circuit for controlling the alternate connection of said two solenoids, said two solenoids controlling the power actuating means for the respective eighth and ninth clutches.

21. Control apparatus according to claim 18 wherein the first manually actuated switch and governor controlled switch are arranged in parallel in the fourth circuit.

22. Control apparatus according to claim 21 wherein a pedal actuated switch controls the flow of current through the fifth circuit.

23. Control apparatus according to claim 22 wherein a plurality of switches in the second circuit controlling the flow of current to majority of the solenoids connected therein, a plurality of switches in the fourth circuit controlling the flow of current to a majority of the solenoids connected therein, a switch in the fourth circuit controlling the flow of current to the governor controlled switch, a switch in the fifth circuit controlling the flow of current therethrough and the switch controlling the flow of current in the bypass current conducting means in the fourth circuit, are all controlled by the operation of the solenoid in the third circuit which does not control the power means for the seventh clutch.

24. Control apparatus according to claim 23 wherein there are four solenoids in parallel in the second circuit, there are four solenoids in parallel in the second circuit, the plurality of switches in said circuit control the flow of current to three of the solenoids and the plurality of switches in the second circuit control the flow of current to three of the four solenoids.

25. Control apparatus according to claim 23 wherein power means are provided for actuating the eighth and ninth clutches, and wherein the two solenoids control respectively the power means for the eighth and ninth clutches.

26. Control apparatus according to claim 24 wherein a hydraulic pressure producing means provides hydraulic fluid under pressure for the actuation of the third through ninth clutches, and valves actuated by the respective solenoids of the second circuit and one of the solenoids of the third circuit and said two solenoids in the fourth circuit control the flow of hydraulic fluid for the actuation of the respective third through seventh clutches.

References Cited in the file of this patent

UNITED STATES PATENTS

| | | |
|---|---|---|
| 1,986,037 | Winther et al. | Jan. 1, 1935 |
| 2,102,598 | McDill | Dec. 21, 1937 |
| 2,317,476 | Newman | Apr. 27, 1943 |
| 2,500,796 | Bullard | Mar. 14, 1950 |